(12) United States Patent
Kumar

(10) Patent No.: US 9,015,432 B1
(45) Date of Patent: Apr. 21, 2015

(54) ESTABLISHING A MAPPING TO A VIRTUAL DISK

(75) Inventor: Sunil Kumar, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 802 days.

(21) Appl. No.: 13/174,341

(22) Filed: Jun. 30, 2011

(51) Int. Cl.
*G06F 12/00* (2006.01)
*G06F 9/455* (2006.01)

(52) U.S. Cl.
CPC .. *G06F 9/45558* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,185,684 B1* | 5/2012 | Naftel | 711/6 |
| 2007/0300034 A1* | 12/2007 | Aoyama | 711/170 |
| 2008/0134177 A1* | 6/2008 | Fitzgerald et al. | 718/1 |
| 2009/0217265 A1* | 8/2009 | Ishikawa | 718/1 |

* cited by examiner

*Primary Examiner* — Baboucarr Faal
(74) *Attorney, Agent, or Firm* — Krishnendu Gupta; Joseph D'Angelo

(57) ABSTRACT

A system, computer program product, and computer implemented method for mapping a Virtual machine (VM) drive to underlying storage, the method comprising locating a signature for a disk mounted to a VM, finding one or more files storage on a storage medium representing the virtual machine file system (VMFS) for a hypervisor that is running the VM, finding a portion of the one or more files on the storage medium that contains the signature, mapping the found portion of the one or more files to be the disk of the VM.

18 Claims, 16 Drawing Sheets

610

| Home |
|---|
| Data Object Type: VirtualHardware<br>  Parent Managed Object ID: snapshot-4111<br>  Property Path: config.hardware |

Properties

| NAME | TYPE | VALUE |
|---|---|---|
| device | VirtualDevice[ ] | • device[1000]<br>• device[2002]<br>• device[1000]<br>• device[2001]<br>• device[1000]<br>• device[2000] |
| dynamicProperty | DynamicProperty[ ] | Unset |
| dynamicType | string | Unset |
| memoryMB | int | 1044 |
| numCPU | int | 1 |

620

| Home |
|---|
| Data Object Type: VirtualDiskFlatVer2BackingInfo<br>  Parent Managed Object ID: snapshot-4111<br>  Property Path: config.hardware.device[2002].backing |

Properties

| NAME | TYPE | VALUE |
|---|---|---|
| datastore | ManagedObjectReference:Datastore | datastore-3993 |
| diskMode | string | "persistent" |
| dynamicProperty | DynamicProperty[ ] | Unset |
| dynamicType | string | Unset |
| fileName | string | "[Clar_20GB_VMFS] vmfs_test/vmfs_test.vmdk" |
| split | boolean | false |
| thinProvisioned | boolean | false |
| uuid | string | "6000C293-9f7b-71b4-82e9-90af42770e72" |
| writeThrough | boolean | false |

FIG. 6

DUMP OF MBR 810

```
C:\vmware\vixDiskLibSample\debug>vixDiskLibSample.exe -dump -start 0 -count 1 c:
\disks\RDVAD013.vmdk
0000  33 c0 8e d0 bc 00 7c fb 50 07 50 1f fc be 1b 7c   3.....|.P.P....|
0010  bf 1b 06 50 57 b9 e5 01 f3 a4 cb 10 bd be 07 b1 04   ...PW..........
0020  38 6e 00 7c 09 75 13 83 c5 10 e2 f4 cd 18 8b f5   8n.|.u..........
0030  83 c6 10 49 74 16 38 2c 74 f6 a0 b5 07 b4 07 8b   ...It.8,t.......
0040  f0 ac 3c 00 74 fc bb 07 00 b4 0e cd 10 eb f2 88   ..<.t...........
0050  4e 10 e8 46 00 73 2a fe 46 10 80 7e 04 0b 74 0b   N..F.s*.F..~..t.
0060  80 7e 04 0c 74 05 0a 56 07 75 d2 80 46 02 06 83   .~..t..V.u..F...
0070  46 08 06 83 56 0a 00 e8 21 00 73 05 a0 b6 07 eb   F...V...!.s.....
0080  bc 81 3e fe 7d 55 aa 74 0b 80 7e 10 00 74 c8 a0   ..>.}U.t..~..t..
0090  b7 07 eb a9 8b fc 1e 57 8b f5 cb bf 05 00 8a f6   .......W........
00a0  c0 64 ff 06 8b b1 06 d1 e6 42 f7 e2 39 16 0b 7c   .d.......B..9..|
00b0  43 f7 36 0e 13 72 23 8a c1 24 3f 98 8a de 8a fc   C.6..r#..$?.....
00c0  43 8b b1 06 d1 06 73 1c c2 b8 01 02 bb 00 7c b4   w#r.9F.s.......
00d0  8b 4e 02 8b 56 00 cd 13 73 51 4f 74 4e 32 e4 8a   .N..V..sQOtN2...
00e0  56 00 cd 13 eb e4 8a 56 00 60 bb aa 55 b4 41 cd   V......V..sQOtN2
00f0  13 72 36 81 fb 55 aa 75 30 f6 c1 01 74 2b 61 60   .r6..U.u0..t+a`
0100  6a 00 6a 00 ff 76 0a ff 76 08 6a 00 68 00 7c 6a   j.j..v..v.j.h.|j
0110  01 6a 10 b4 42 8b f4 cd 13 61 61 73 0e 4f 69 6e   .j..B....aas.Ot
0120  74 32 e4 8a 56 00 cd 13 eb d6 61 f9 c3 49 6e 76   t2..V......Inva
0130  61 6c 69 64 20 70 61 72 74 69 74 69 6f 6e 20 74   lid partition t
0140  61 62 6c 65 00 45 72 72 6f 72 20 6c 6f 61 64 69   able.Error loadi
0150  6e 67 20 6f 70 65 72 61 74 69 6e 67 20 73 79 73   ng operating sys
0160  74 65 6d 00 4d 69 73 73 69 6e 67 20 6f 70 65 72   tem.Missing oper
0170  61 74 69 6e 67 20 73 79 73 74 65 6d 00 00 00 00   ating system....
0180  00 00 00 00 00 00 00 00 00 00 00 00 00 00 00 00   ................
0190  00 00 00 00 00 00 00 00 00 00 00 00 00 00 00 00   ................
01a0  00 00 00 00 00 00 00 00 00 00 00 00 00 00 00 00   ................
01b0  00 00 00 00 00 00 00 00 2c 44 3f 1a 00 00 00 00   ........,Dc?....
01c0  01 00 07 d3 aa 22 00 fb 04 00 00 20 02 00 00 00   ....."..........
01d0  00 00 00 00 00 00 00 00 00 00 00 00 00 00 00 00   ................
01e0  00 00 00 00 00 00 00 00 00 00 00 00 00 00 00 00   ................
01f0  00 00 00 00 00 00 00 00 00 00 00 00 00 00 55 aa   ..............U.
```

DiskSignature 830

DiskPart ON DISK 820

DISKPART> select disk 3

Disk 3 is now the selected disk.

DISKPART> detail disk

UMware Virtual disk SCSI Disk Device
Disk ID : 1AFDF0F3
Type    : SCSI
Bus     : 0
Target  : 3
LUN ID  : 0

| Home |
| --- |
| Data Object Type: VirtualHardware<br>  Parent Managed Object ID: snapshot-4111<br>  Property Path: config.hardware |

Properties

| NAME | TYPE | VALUE |
| --- | --- | --- |
| device | VirtualDevice[ ] | • device[1000]<br>• device[2002]<br>• device[1000]<br>• device[2001]<br>• device[1000]<br>• device[2000] |
| dynamicProperty | DynamicProperty[ ] | Unset |
| dynamicType | string | Unset |
| memoryMB | int | 1044 |
| numCPU | int | 1 |

⟵ 1120

| Home |
| --- |
| Data Object Type: VirtualDiskFlatVer2BackingInfo<br>  Parent Managed Object ID: snapshot-4111<br>  Property Path: config.hardware.device[2002].backing |

Properties

| NAME | TYPE | VALUE |
| --- | --- | --- |
| datastore | ManagedObjectReference:Datastore | datastore-3993 |
| diskMode | string | "persistent" |
| dynamicProperty | DynamicProperty[ ] | Unset |
| dynamicType | string | Unset |
| fileName | string | "[Clar_20GB_VMFS] vmfs_test/vmfs_test.vmdk" |
| split | boolean | false |
| thinProvisioned | boolean | false |
| uuid | string | "6000C293-9f7b-71b4-82e9-90af42770e72" |
| writeThrough | boolean | false |

FIG. 11

| BYTE OFFSET | FIELD LENGTH | SAMPLE VALUE | FIELD NAME |
|---|---|---|---|
| 0x0B | Word | 0x0002 (512) | Bytes per Sector |
| 0x0D | Byte | 0x08 | Sectors per Cluster |
| 0x0E | Word | 0x000 | Reserved Sectors |
| 0x10 | 3 Bytes | 0x000000 | reserved |
| 0x13 | Word | 0x0000 | not used |
| 0x15 | Byte | 0xF8 | Media Descriptor |
| 0x16 | Word | 0x0000 | reserved |
| 0x18 | Word | 0xF300 (63) | Sectors per Track |
| 0x1A | Word | 0xFF00 (225) | Number of Heads |
| 0x1C | DWord | 0x3F000000 (63) | Hidden Sectors |
| 0x20 | DWord | 0x00000000 | not used |
| 0x24 | DWord | 0x00800080 | not used |
| 0x28 | QWord | 0x00000000009C25FD | Total Sectors |
| 0x30 | QWord | 0x0000000000000004 | $MFT Start Cluster |
| 0x38 | QWord | 0x000000000009C25F | $MFTmirr Start Cluster |
| 0x40 | DWord | 0x000000F6 | Clusters per FRS |
| 0x44 | DWord | 0x00000001 | Cluster per Index |
| 0x48 | QWord | 0xD83AEE5E98D83B12 | Volume Serial number |
| 0x50 | DWord | 0x00000000 | CRC |

ⓐ TO FIG. 13B

VolumeSerialNumber 1310

```
F:\>fsutil fsinfo ntfsinfo f :
NTFS Volume Serial Number :   0xca9452bc9452aaa9
Version :                     3.1
Number Sectors :              0x000000000000efff
Total Clusters :              0x000000000000efff
Free Clusters :               0x000000000000dc80
Total Reserved :              0x0000000000000000
Bytes Per Sector :            512
Bytes Per Cluster :           512
Bytes Per FileRecord Segment :  1024
Clusres Per FileRecord Segment : 2
Mft Valid Data Length :       0x0000000000008000
Mft Start Lcn :               0x0000000000005000
Mft2 Start Lcn :              0x00000000000077ef
Mft Zone Start :              0x0000000000005020
Mft Zone end :                0x0000000000006e00
```

ESTABLISHING A MAPPING TO A VIRTUAL DISK

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

This application is related to co-pending US Patent Application, filed even date, Ser. No. 13/174,305 entitled "VIRTUAL MACHINE BACK-UP," which is hereby incorporated by reference in its entirety. This application is related to co-pending US Patent Application, filed even date, Ser. No. 13/174,326 entitled "VIRTUAL MACHINE DATA RECOVERY," which is hereby incorporated by reference in its entirety.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Virtual processing such as VMware is another known area that offers advantages in data processing, including in the area of apparent configuration to a user. It would be advancement in both the virtual processing and data storage arts to exploit better the respective individual capabilities for reaping more and better benefits for users in the respective fields.

SUMMARY

A system, computer program product, and computer implemented method for mapping a Virtual machine (VM) drive to underlying storage, the method comprising locating a signature for a disk mounted to a VM, finding one or more files storage on a storage medium representing the virtual machine file system (VMFS) for a hypervisor that is running the VM, finding a portion of the one or more files on the storage medium that contains the signature, mapping the found portion of the one or more files to be the disk of the VM.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 6 is a simplified illustration a virtual disk path of a snapshot, in accordance with an embodiment of the present disclosure;

FIG. 8 is a simplified illustration of a dump of a master boot record (MBR) showing a disk signature, in accordance with an embodiment of the present disclosure;

FIG. 11 is an alternative simplified illustration a virtual disk path of a snapshot, in accordance with an embodiment of the present disclosure;

Figure 13B:
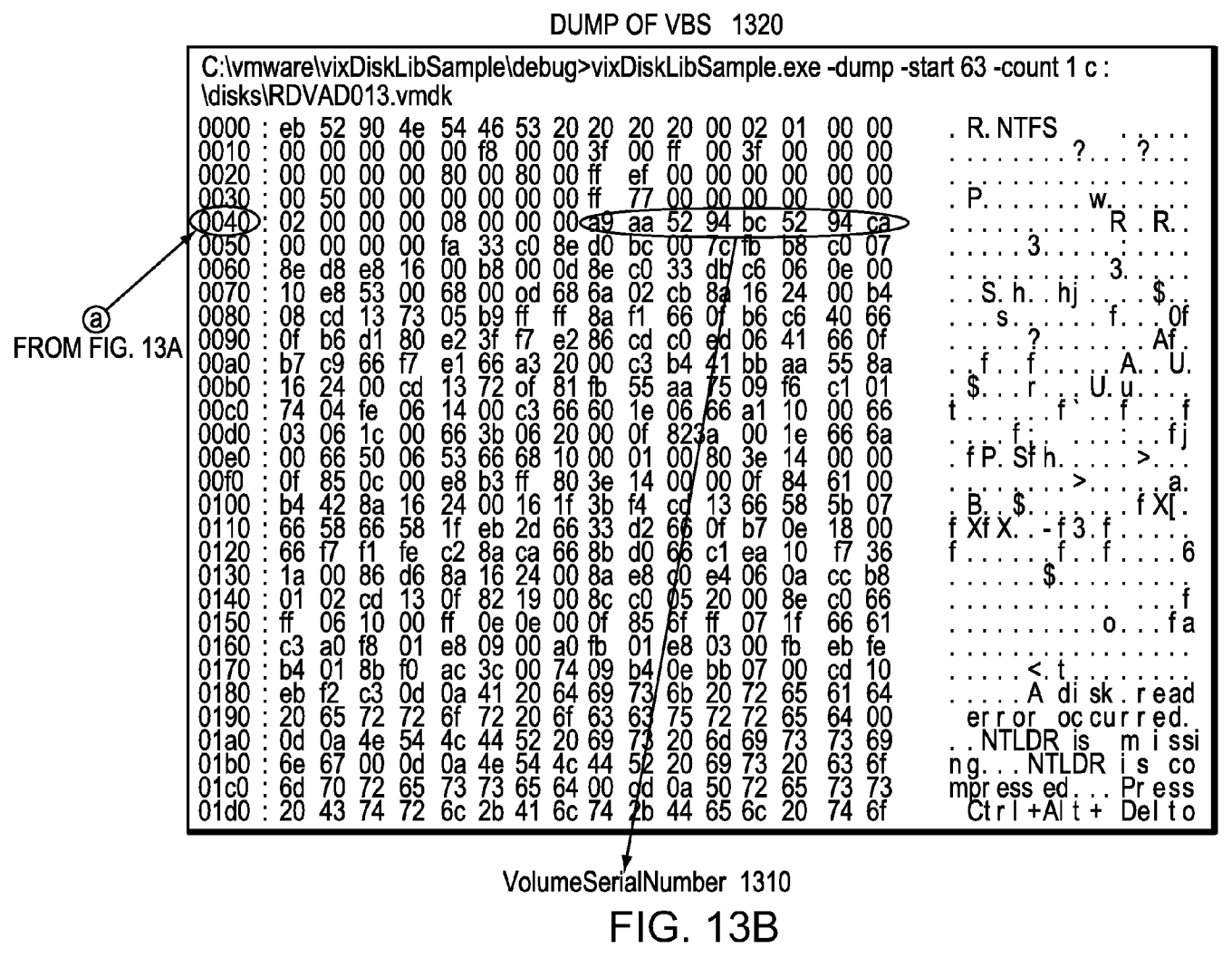

FIG. 13 is a simplified illustration of a dump of a Volume Boot Sector (VBS) showing a Volume Serial Number, in accordance with an embodiment of the present disclosure;

DETAILED DESCRIPTION

Figure 1:
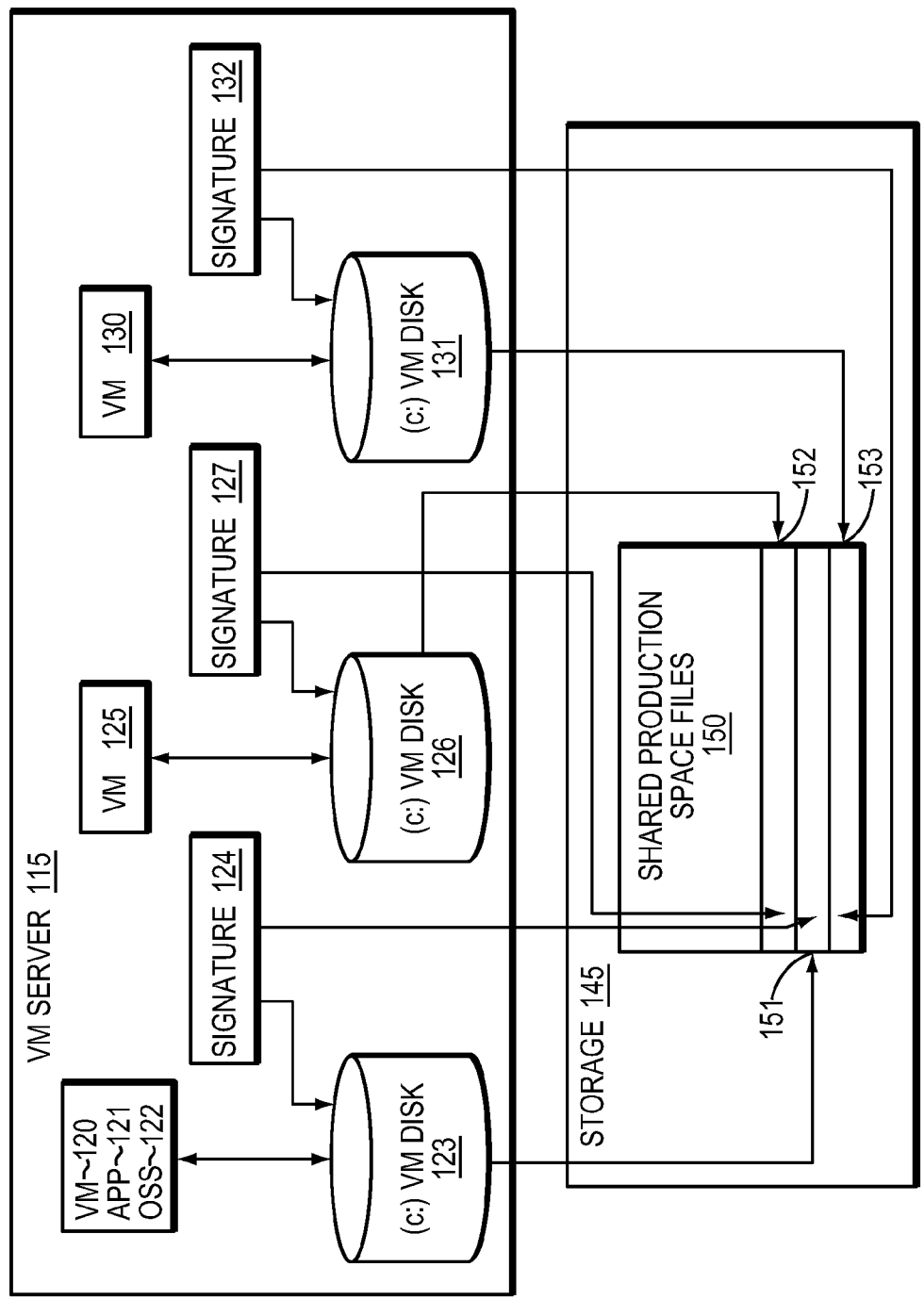
FIG. 1 is a simplified illustration of a virtual machine server, virtual machines, and a shared production space, in accordance with an embodiment of the present disclosure.

In an embodiment, the current disclosure may enable mapping between a windows drive configured inside a virtual machine and the backend virtual device. In an embodiment, the current disclosure may enable mapping between a windows drive configured inside a virtual machine and the backend physical or logical device. In some embodiments, the mapping may use a signature on the virtual drive. In particular embodiments, the mapping may be based on a disk signature comparison. In alternative embodiments, the mapping may be based on a volume serial number comparison.

Generally, an ESX, VM server, or hypervisor, used interchangeable herein, may be software that runs one or more virtual machines (VM). Typically, a LUN will be created and exposed to a hypervisor or ESX. Usually, the hypervisor may create a file system such as a virtual machine file system (VMFS). In most cases, the VMFS may have one or more drives presentable to VMs. Generally, the hypervisor may then expose one or more disks of the VMFS to a VM. Traditionally, each VM may have one or more disks mounted to the VM. Conventionally, a disk may appear to the VM as a physical disk but may be represented as a file to the ESX or hypervisor. Typically, to a storage medium, the VMFS file may appear to be the same as any other stored file. Using conventional techniques, there may be no way to figure out which file belongs to which VM. Conventional techniques may not enable determination of which VM disk is mapped to what portion of the hypervisor's VMFS. As used herein, the term storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image.

Conventionally, use of virtual machine technology, for example as provided by VMWare or Citrix, includes a combination of traditional backup software (e.g. EMC Avamar, Networker, Symantec Netbackup) and or vStorage API toolkit to back up the Virtual machine and File System and application data residing on these virtual Machines. Generally, this method of back involves backup clients reading the data from the production Storage LUNs. Traditionally, there is not a way to figure out a mapping between the windows drive letter (e.g. c:, E:,F: etc) configured inside a windows virtual machine running on VM server and the backend virtual disk device.

In certain embodiments, the tools provide by the hypervisor or virtual server may be used to obtain a signature from the virtual machine. In some embodiments with VMWare virtual machines, the VMW virtual disk development (VDDK) may be used to obtain the signature. In other embodiments with VMWare, the VMW VI SDK may be used to obtain the signature.

Virtual machine technology, including the ESX server is described in U.S. Pat. No. 6,397,242 to Devine et. al, issued May 28, 2002 and assigned to VMware, a majority owned subsidiary of EMC Corporation, the assignee of the present invention. This '242 patent is hereby incorporated in its entirety by this reference. The virtual machine technology interacting with a data storage environment is described in U.S. Pat. No. 7,552,279 to Mark Gandler issued Jun. 23, 2009 and assigned to EMC Corporation, the assignee of the present invention. This '279 patent is hereby incorporated in its entirety by this reference. Consequently, the following discussion makes only general references to the operation of such virtual machine technology.

Refer now to the example embodiment of FIG. 1. In FIG. 1 there is a VM server or hypervisor 115. The VM server has virtual machines, such as VMs 120, 125, and 130. Each VM has a "physical" drive mounted to the VMs, such as VM disk 123 for VM 120, VM Disk 126, for VM 125, and VM Dish 131 for VM 130. Each VM Disk also has a signature, such as signatures 124, 127, and 132. In turn, each of the disks are stored on storage 145 in shared production space 150. In shared production space 150, the data in each of VM Disks 123, 126, and 131 is stored. However, storage 145 may have no visibility as to which VM disk is stored where on shared production space 150. Shared production space 150 may be stored in one or more files such as files 151, 152, and 153. In some embodiments, the shared production space may be stored in a single file.

Figure 2:
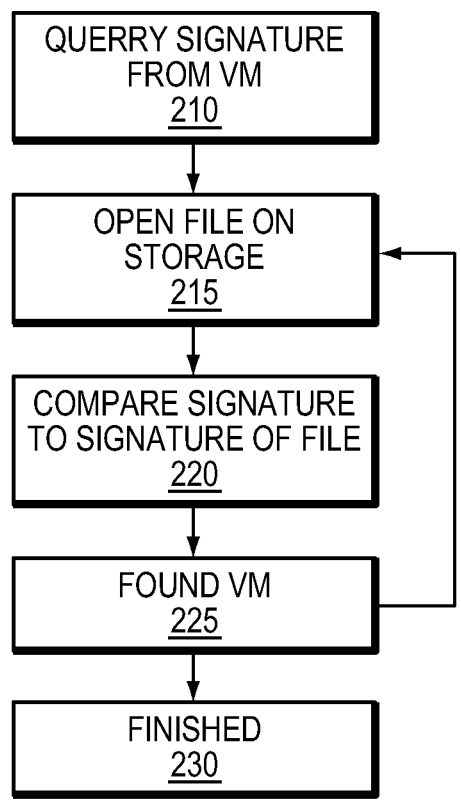
FIG. 2 is a simplified method for mapping a VM drive, in accordance with an embodiment of the present disclosure.
Figure 3:
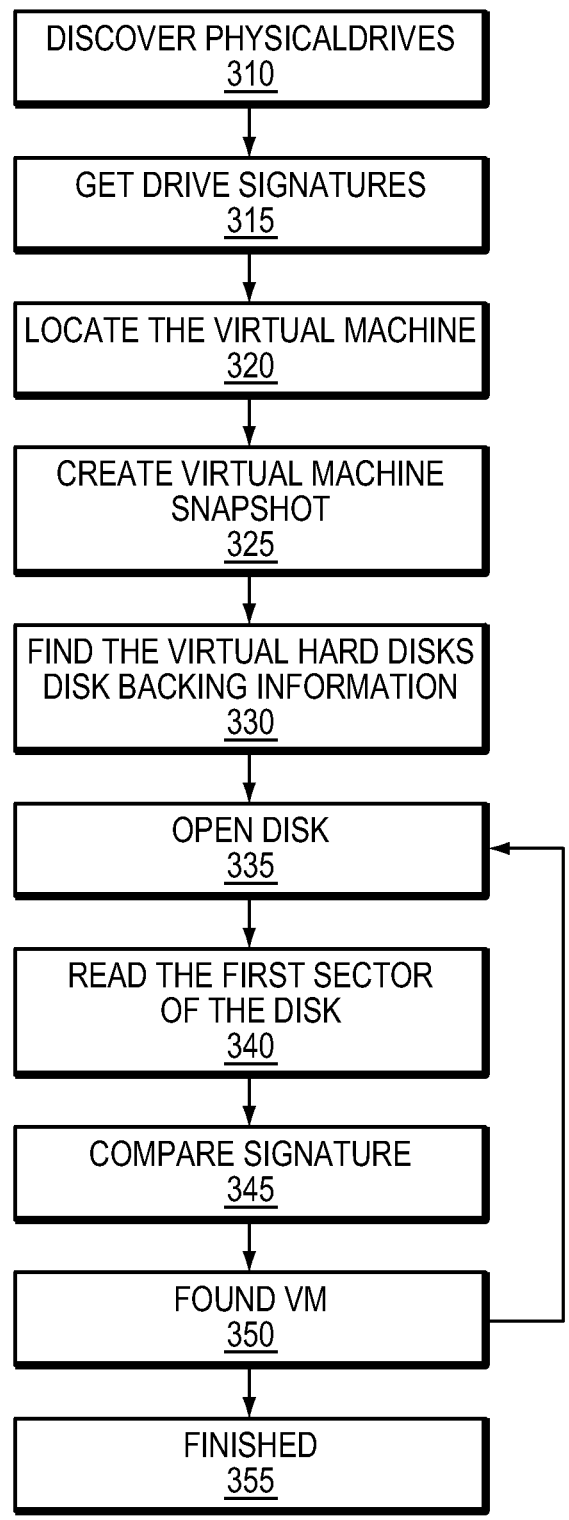
FIG. 3 is an alternative simplified method for mapping a VM, in accordance with an embodiment of the present disclosure.
Figure 4:
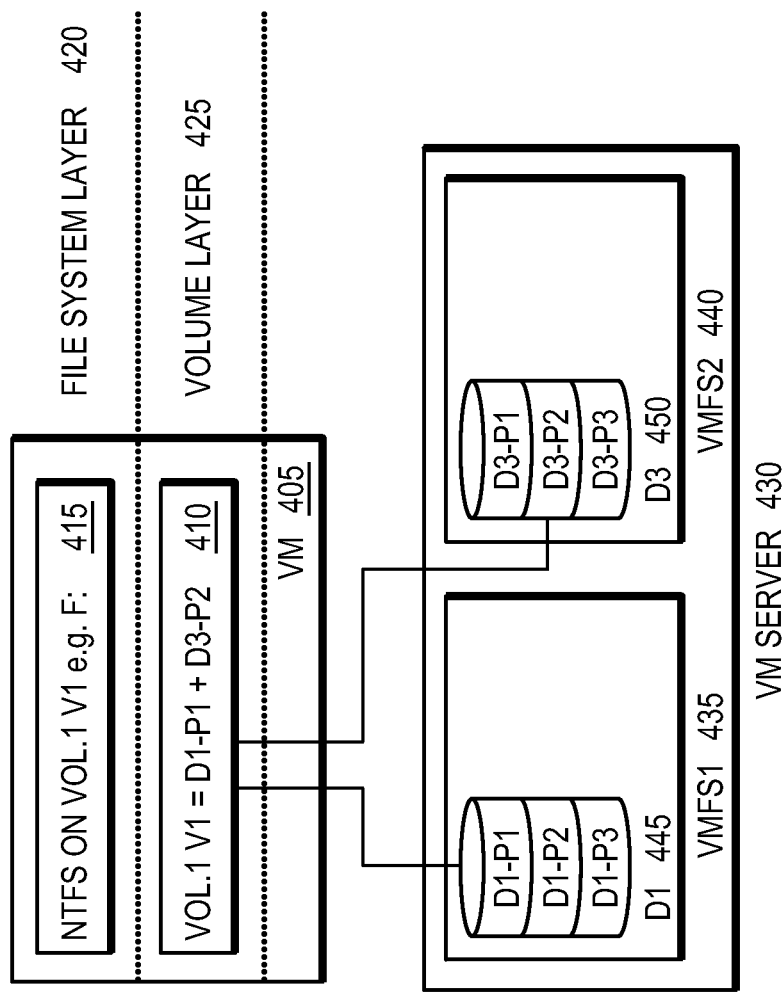
FIG. 4 is a simplified illustration of a file system layer and a volume layer, in accordance with an embodiment of the present disclosure.
Figure 5:
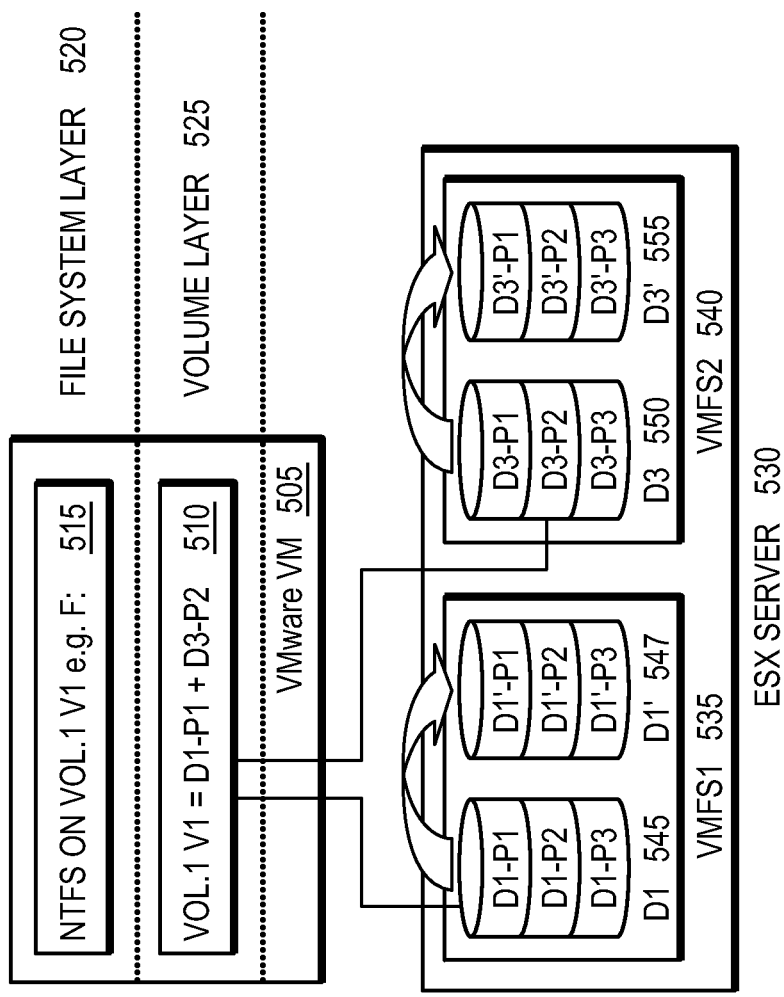
FIG. 5 is a simplified illustration creating a virtual machine snapshot, in accordance with an embodiment of the present disclosure.
Figure 7:
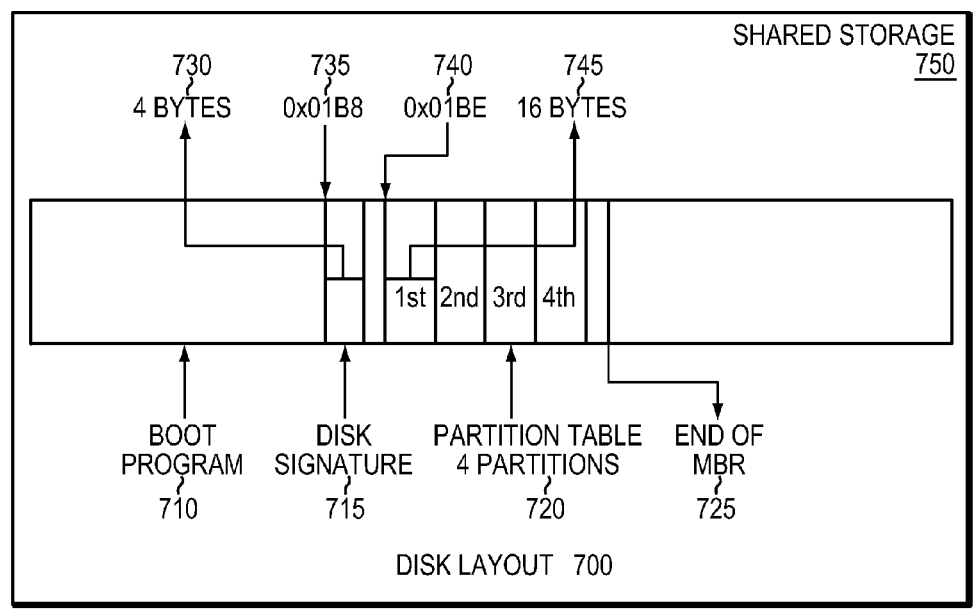
FIG. 7 is a simplified illustration of a VM disk layout, in accordance with an embodiment of the present disclosure.
Figure 9:
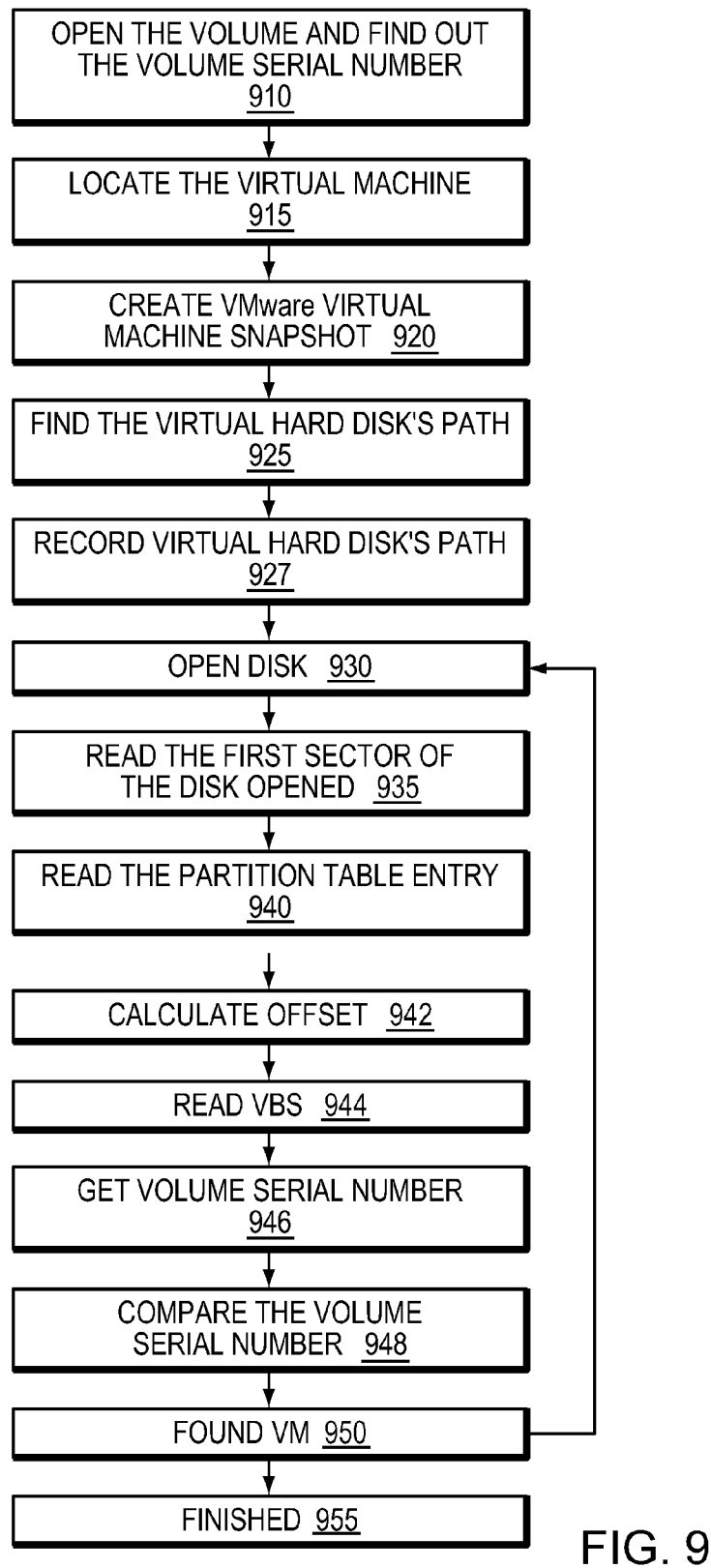
FIG. 9 is an alternative simplified method for mapping a VM drive, in accordance with an embodiment of the present disclosure.
Figure 10:
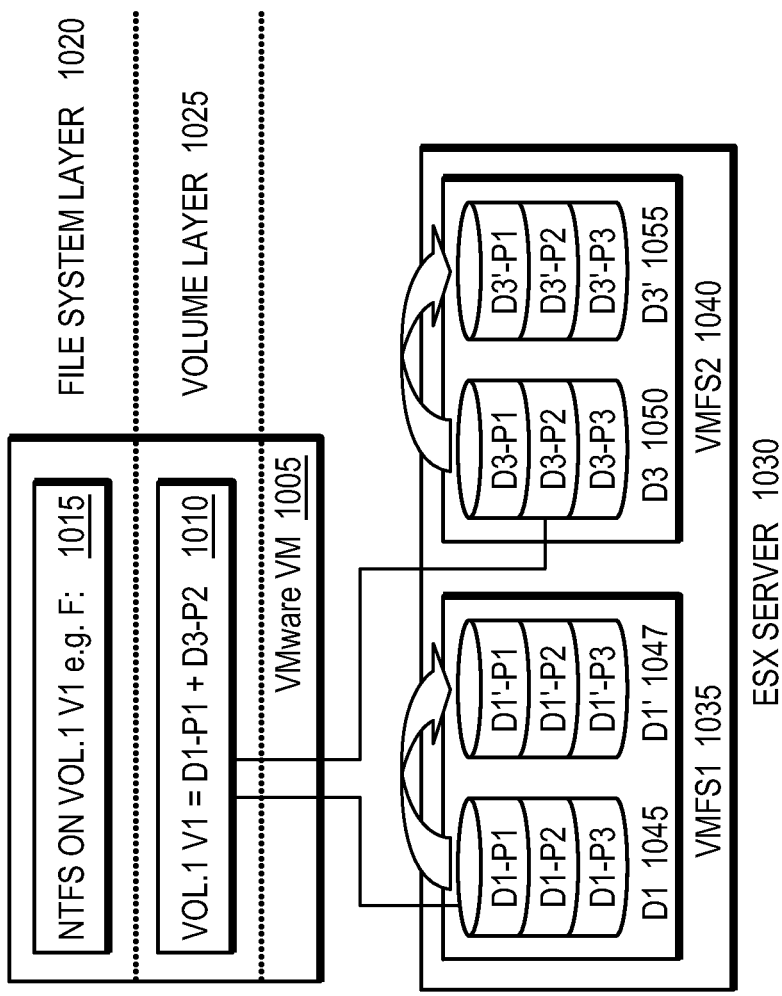
FIG. 10 is an alternative simplified illustration creating a virtual machine snapshot, in accordance with an embodiment of the present disclosure.
Figure 12:
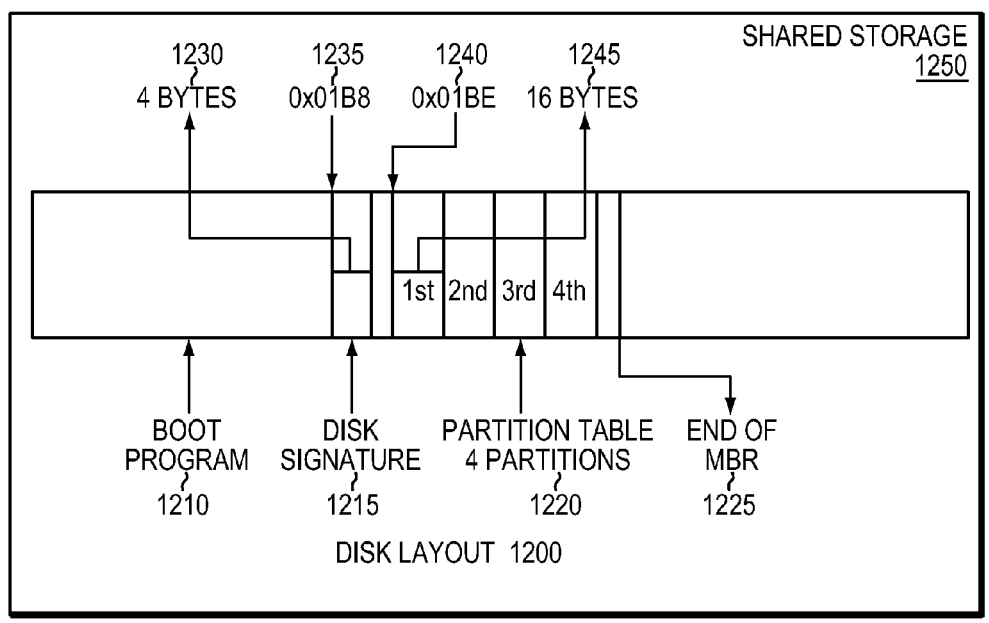
FIG. 12 is a simplified illustration of a VM disk layout, in accordance with an embodiment of the present disclosure.

Refer now to the sample embodiments of FIGS. 1 and 2. The signature for a VM disk, such as signature 124 of VM disk 123 may be found by VM 120 (step 210). In some embodiments, the signature may be found by issuing an IOCTL to the disk. The shared production space, which is stored as a file, may be opened (Step 215). Signature 124 may be compared to the signatures in the file (step 220). The portion of the file corresponding to VM 120 may be found (step 225).

Refer now to the example embodiments of FIGS. 3-8. The physical drives, 435, 440, that make up partition 410 that stores the volume 415 may be discovered (step 310). In some embodiments the physical drives may be discovered using an API of the operating system, such as the Microsoft Window's API. For physical drives, 435, 440, the disk signatures may be found (step 320). In some embodiments, the signatures may be found by reading 4 bytes from a particular location/offset on the physical disk. In certain embodiments, the disk signatures may be found with the following pseudo code:

CreateFile("\\\\.\\PhysicalDrive0", GENERIC_READ, FILE_SHARE_READ|FILE_SHARE_WRITE, NULL, OPEN_EXISTING, 0, NULL)

DRIVE_LAYOUT_INFORMATION_EX *pinfo; DeviceIoControl(hDevice, IOCTL_DISK_GET_DRIVE_LAYOUT_EX, NULL, 0,(LPVOID) pInfo,dwSize,&dwBytesReturn,NULL)

pinfo→Mbr.Signature- - - - - - - - - - - - ->4 Bytes. Contains the signature of Disk Virtual machine 505 on which 515 volume exists in the VM or ESX inventory may be located (step 320). In some embodiments, this maybe done with the following pseudo code.

GetVirtualMachineESXHostByIP(const string ipaddr, string &esxname,string &vmid)

GetVirtualMachineESXHostByDnsName(const string hostname, const string domainname, string &esxname,string &vmid)

Virtual machine snapshots, 547, 555 may be created (step 325). In some embodiments, a hypervisor may not allow opening a virtual machine's disk which is in use. In certain embodiments, by creating the snapshot, the VM's base disk may be opened in READ_ONLY mode.

Virtual disk virtual path information, 610, 620, may be found from the snapshot (step 330). In some embodiments, the virtual disk path may be stored. Disk 700 is opened (step 335). In some embodiments, the disks may be opened with the following pseudo code VixDiskLib_Init VixDiskLib_Connect-Connect to VC Server with appropiate creds. and vmxspec VixDiskLib_Open with VIXDISKLIB_FLAG_OPEN_READ_ONLY and disk backing path The first sector of disk 700 is read to get signature 715 (step 340). Signature 715 in disk 700 is compared to the stored signature (step 345). If the signatures are the same, VM 505 is found (step 350). If VM 505 is not found, the process is iterated (step 335). Refer now to the example embodiment of FIG. 8. FIG. 8 illustrates the location of a disk signature in a screenshot. FIG. 820 represents what may be shown on the VM screen when a manual query for the MBR is performed.

Refer now to the example embodiments of FIGS. 9-13. Volume 1010 to be mapped is opened (step 910). In some embodiments, the volume may be opened using the following pseudo code:

CreateFile(_T("\\\\.\\F:"), GENERIC_READ, FILE_SHARE_READ|FILE_SHARE_WRITE, NULL, OPEN_EXISTING, 0, NULL);
NTFS_VOLUME_DATA_BUFFER ntvdf;
DeviceIoControl(hDevice, FSCTL_GET_NTFS_VOLUME_DATA, NULL, 0, (LPVOID)&ntvdf, dwStructSize, &dwByteRet, NULL);
ntvdf.VolumeSerialNumber→8 Bytes. Contains the VolumeSerialNumber.

The volume serial number is acquired and stored (step 915). Virtual machine 1005 is located (step 920). In some embodiments, the virtual machine may be located using the following pseudo code:

GetVirtualMachineESXHostByIP(const string ipaddr, string &esxname,string &vmid)
GetVirtualMachineESXHostByDnsName(const string hostname, const string domainname, string &esxname,string &vmid)

Virtual machine snapshot, 1047, 1055 is created (step 925). In some embodiments, a snapshot may be taken as a hypervisor may not an active virtual machine's disk to be opened. Path information 1110, 1120 for the virtual disk is recorded (step 927). In some embodiments, the path information may be in the form "[vmfs] vm/vm.vmdk." In certain embodiments, the virtual disk path information may be stored in a list. In further embodiments, this may have a new API in ermvim to query VD backing info from the snapshot.

Disk 1200 is opened (step 930). In some embodiments, the disk may be opened using the following pseudo code:

VixDiskLib_Init
VixDiskLib_Connect-Connect to VC Server with appropriate creds. and vmxspec
VixDiskLib_Open with VIXDISKLIB_FLAG_OPEN_READ_ONLY and disk backing path The first sector of the disk is read (step 935). In some embodiments, this will be the first 512 bytes of the disk which form the master boot record. Partition table entry 1220 of disk 1200 is read (step 940). In some embodiments, the partition table may start at offset 0x01BE in the MBR buffer. In further embodiments, there may be 4 partition entries in the MBR. The partition start sector offset may be calculated (step 942). In certain embodiments, the first sector at the offset will hold the volume boot sector (VBS). The VBS may be read by dumping the first sector, which in some embodiments may be 512*b* (step 944). The first 8 bytes of the offset may be read to determine the Volume Serial number (step 946). In some embodiments, the offset may be 0x48. A comparison is made to the volume serial number (step 948). A determination is made if VM 1005 is found (step 950).

Figure 14:
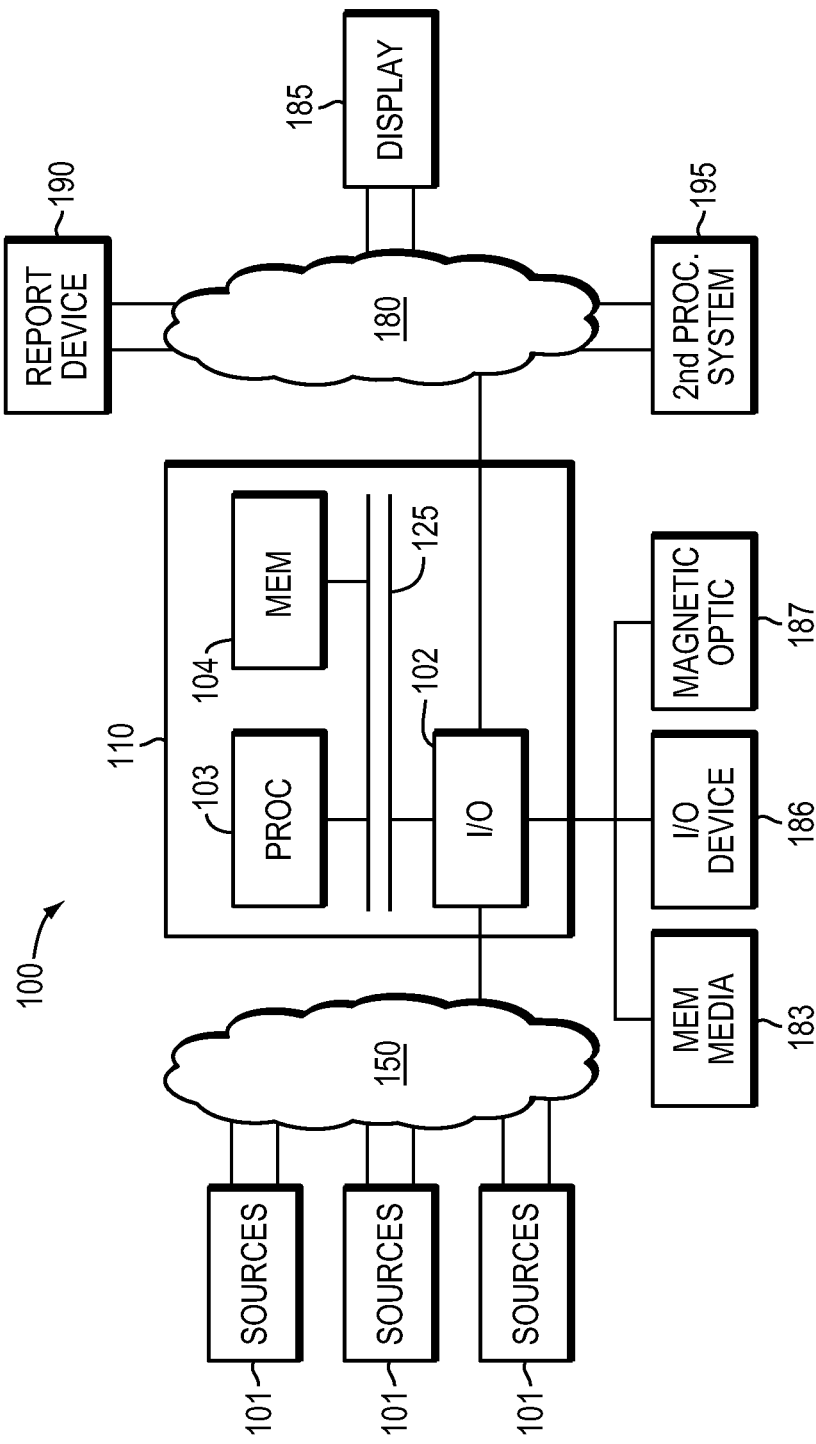
FIG. 14 is an example of an embodiment of an apparatus that may utilize the techniques described herein, in accordance with an embodiment of the present disclosure.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as being loaded into memory 1404 and executed by processor 1403 of the computer of FIG. 14, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 15:
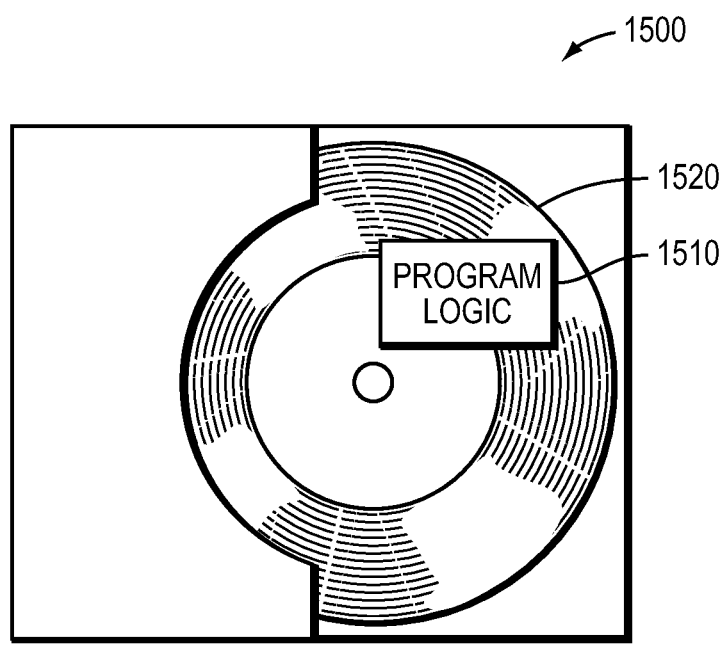
FIG. 15 is an example of an embodiment of a method embodied on a computer readable storage medium that may utilize the techniques described herein, in accordance with an embodiment of the present disclosure.

FIG. 15 shows Program Logic 1510 embodied on a computer-readable medium 1530 as shown, and wherein the Logic is encoded in computer-executable code configured for carrying out the reservation service process of this invention and thereby forming a Computer Program Product 1500.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art may appreciate that the device is not limited to the specific configuration but rather only by the claims included with this specification.

Although the foregoing invention has been described in some detail for purposes of clarity of understanding, it may be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it will be appreciated that, in addition to data replication systems, the optimal journaling policy of the present invention has widespread application to journaling systems including database systems and version control systems.

In the foregoing specification, the invention has been described with reference to specific exemplary embodiments thereof. It may, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer implemented method for mapping a Virtual machine (VM) drive to underlying storage, the method comprising:
    locating a signature for a physical disk mounted to a VM, the signature to the physical disk being assigned by an operating system;
    creating a snapshot of the physical disk to the VM while the VM is in operation;
    querying the snapshot of the physical disk in read-only mode for the signature;
    finding a signature associated with at least one or more files on a storage medium representing a virtual machine file system (VMFS) for a hypervisor that is running the VM;
    finding a portion of the at least one or more files on the storage medium that contains the signature;
    comparing the signature of the snapshot of the physical disk with the signature associated with at least one or more files on the storage medium until a common signature is found; and
        mapping the found portion of the at least one or more files on the storage medium for the hypervisor to the physical disk mounted on the VM.

2. The computer implemented method of claim 1 wherein the finding a portion of the at least one or more files comprises:
    opening the at least one or more files corresponding to the VMFS.

3. The computer implemented method of claim 1 wherein the signature is a volume serial number.

4. The computer implemented method of claim 1 wherein the signature is a master boot record.

5. The computer implemented method of claim 1, the method further comprising:
  finding the VM's disk virtual path.

6. The computer implemented method of claim 1, wherein querying the snapshot of the physical disk in read-only mode for the signature includes locating backing information and a virtual disk path associated with the snapshot of the physical disk.

7. A computer program product for mapping a Virtual machine (VM) drive to underlying storage comprising:
  a non-transitory computer readable medium encoded with computer executable program code for using read signatures in replication, the code configured to enable the execution of:
  locating a signature for a physical disk mounted to a VM, the signature to the physical disk being assigned by an operating system;
  creating a snapshot of the physical disk to the VM while the VM is in operation;
  querying the snapshot of the physical disk in read-only mode for the signature;
  finding a signature associated with at least one or more files on a storage medium representing a virtual machine file system (VMFS) for a hypervisor that is running the VM;
  finding a portion of the at least one or more files on the storage medium that contains the signature; and
  comparing the signature of the snapshot of the physical disk with the signature associated with at least one or more files on the storage medium until a common signature is found; and
  mapping the found portion of the at least one or more files on the storage medium for the hypervisor to the physical disk mounted on the VM.

8. The computer program product of claim 7, wherein the finding a portion of the at least one or more files comprises:
  opening the at least one or more files corresponding to the VMFS.

9. The computer program product of claim 7 wherein the signature is a volume serial number.

10. The computer program product of claim 7 wherein the signature is a master boot record.

11. The computer program product of claim 7, the method further comprising:
  finding the VM's disk virtual path.

12. The computer program product of claim 7, wherein querying the snapshot of the physical disk in read-only mode for the signature includes locating backing information and a virtual disk path associated with the snapshot of the physical disk.

13. A system for providing a back-up application agnostic back-up during asynchronous data replication, the system comprising:
  a virtual machine (VM);
  a disk mounted to the VM;
  a storage medium;
  a virtual machine file system (VMFS), stored on the storage medium; and
  computer-executable logic operating in memory, wherein the computer-executable program logic is configured for execution of:
  locating a signature for a physical disk mounted to a VM, the signature to the physical disk being assigned by an operating system;
  creating a snapshot of the physical disk to the VM while the VM is in operation;
  querying the snapshot of the physical disk in read-only mode for the signature;
  finding a signature associated with at least one or more files on a storage medium representing the virtual machine file system (VMFS) for a hypervisor that is running the VM;
  finding a portion of the at least one or more files on the storage medium that contains the signature; and
  comparing the signature of the snapshot of the physical disk with the signature associated with at least one or more files on the storage medium until a common signature is found; and
  mapping the found portion of the at least one or more files on the storage medium for the hypervisor to the physical disk mounted on the VM.

14. The system of claim 13, wherein the finding a portion of the at least one or more files comprises:
  opening the at least one or more files corresponding to the VMFS.

15. The system of claim 13 wherein the signature is a volume serial number.

16. The system of claim 13 wherein the signature is a master boot record.

17. The system of claim 13 wherein the computer-executable program logic is further configured for execution of:
  finding the VM's disk virtual path.

18. The system of claim 13, wherein querying the snapshot of the physical disk in read-only mode for the signature includes locating backing information and a virtual disk path associated with the snapshot of the physical disk.

* * * * *